United States Patent
Otala (10) Patent No.: US 6,222,638 B1
(45) Date of Patent: Apr. 24, 2001

(54) DISPLAYING PRINTER PROPERTY SHEETS

(75) Inventor: Tapani Juha Otala, San Jose, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 08/938,449

(22) Filed: Sep. 29, 1997

(51) Int. Cl.$^7$ .................................................. G06K 15/00
(52) U.S. Cl. ........................................... 358/1.18; 358/1.1
(58) Field of Search ................................... 395/101, 112, 395/114, 115, 117, 113, 828, 830, 834, 836, 892; 709/301; 712/29, 30; 345/326, 333–335, 339–347, 353, 354, 356, 357, 520; 358/1.1, 1.13, 1.15, 1.16, 1.18, 1.14; 710/8, 10, 14, 26, 72

(56) References Cited

U.S. PATENT DOCUMENTS

| | | | |
|---|---|---|---|
| 5,537,596 | 7/1996 | Yu et al. | 395/700 |
| 5,566,278 | 10/1996 | Patel et al. | 395/114 |
| 5,613,123 | 3/1997 | Tsang et al. | 395/651 |
| 5,844,551 | * 12/1998 | Nakajima et al. | 345/326 |

OTHER PUBLICATIONS

N. Cluts, "Extending the Windows 95 Shell", MSDN News, Jul. 1995, pp. 1–4.
J. Richter, "Fusing Your Applications to the System Through the Windows95 Shell", Microsoft Systems Journal, Apr. 1996, pp. 1–15.
J. Prosise, "Integrate Your Applications with the Windows 95 User Interface Using Shell Extensions", Microsoft Systems Journal, Mar. 1995, pp. 1 to 48.

* cited by examiner

Primary Examiner—Arthur G. Evans
(74) Attorney, Agent, or Firm—Fitzpatrick, Cella, Harper & Scinto (57) ABSTRACT

A printer driver having a 32-bit portion for providing a 32-bit property page for insertion into a standard Windows property sheet. The printer driver also has a 16-bit portion for exposing a device driver interface (DDI) entry point, and for providing a dummy property page when the entry point is called. The dummy property page is destroyed before it is displayed. Also provided is a printer driver having a 32-bit property sheet shell extension registered for printers. A 16-bit portion of the printer driver exposes a device driver interface entry point and which provides a dummy property page when the device driver interface entry point is called, the dummy property page indicating that a callback function is to be executed. The callback function signals an operating system to destroy the dummy property page before it is displayed.

18 Claims, 11 Drawing Sheets

DISPLAYING PRINTER PROPERTY SHEETS

BACKGROUND OF THE INVENTION

1. Field of the Invention

The present invention relates to the display of printer property pages, and particularly relates to the integral display of printer property pages generated by a printer driver having a 32-bit user interface together with property pages provided automatically by default by a windowing operating system.

2. Description of the Related Art

In a windowing operating system such as Windows 95™, each printer has associated properties such as page size and orientation, rendering and halftoning modes, page layout modes, default color matching modes, and the like. These properties can be displayed by pulling up the printer's property sheet. For example, in Windows 95™ a user can select the Printers folder, right click on a displayed printer to pop up the printer's context menu, and then select "Properties" from the context menu so as to cause the printer's property sheet to be displayed. The property sheet contains multiple tabbed pages, with each page displaying one aspect of the printer's properties. An example of a property sheet is shown in FIG. 1.

Figure 1:
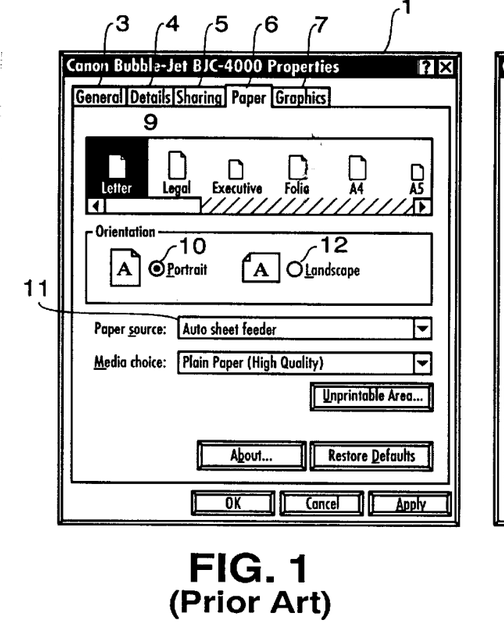
FIG. 1 illustrates a property sheet for a printer using a 16-bit printer driver.

Specifically, FIG. 1 illustrates property sheet 1 as it would appear displayed on a computer's display monitor. Property sheet 1 includes tabbed property pages 3 through 7, with the "Paper" property page 6 currently selected. Any of the other property pages can be selected instead of "Paper" page 6 simply by clicking on the page's tab. Ordinarily, "General" page 3, "Details" page 4 and "Sharing" page 5 are provided automatically by default by the operating system. Additional pages such as "Paper" page 6 and "Graphics" page 7, on the other hand, typically are provided by the printer driver.

Most printer drivers today are legacy 16-bit drivers. Since it is the operating system that displays the property sheet, it is also the operating system that accommodates the display of additional property pages provided by these 16-bit printer drivers. Specifically, the operating system merely requires the 16-bit printer driver to expose a device driver interface ("DDI") entry point called ExtDeviceModePropSheet, which provides one or more property pages upon request from the operating system. Thus, whenever the operating system receives a user request to display a printer property sheet it automatically attempts to call the driver's ExtDeviceModePropSheet DDI entry point. If this entry point is in fact provided by the printer driver, the Windows operating system automatically displays the additional property pages returned from the 16-bit printer driver. In particular, the operating system displays the 16-bit driver property pages integrally with the property pages generated by the operating system, as illustrated in FIG. 1.

Recently, 16-bit printer drivers have begun to be replaced by 32-bit printer drivers. The newer 32-bit printer drivers can also generate property pages similar to those generated by 16-bit printer drivers. In addition, 32-bit printer drivers can take advantage of 32-bit operating system features, such as preemptive multi-threading and additional user interface elements, which are available to 32-bit code but not to 16-bit code. Preemptive multi-threading, for instance, can permit more flexible coding and more efficient processing in certain cases. Thus, it is generally desirable to implement printer drivers, including the driver's user interface, using 32-bit code.

However, these newer 32-bit printer drivers having a 32-bit user interface cannot utilize the 16-bit DDI mechanism described above. Accordingly, when the operating system does not detect the 16-bit DDI entry point, the operating system instead automatically provides an additional user interface in the form of a "setup" interface button.

Figure 2A:
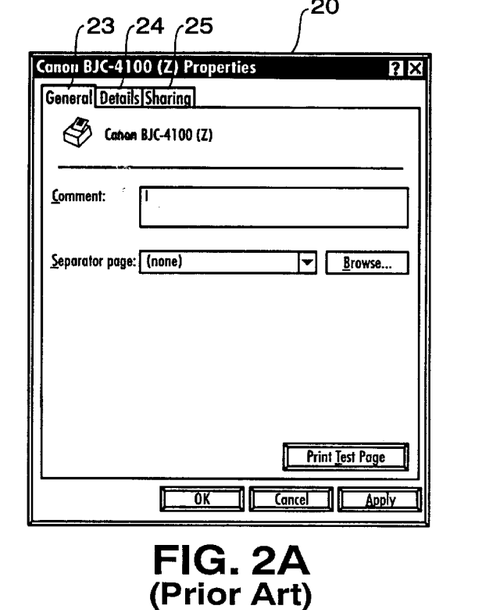
FIGS. 2A and 2B illustrates the initial property sheet for a printer using a conventional 32-bit printer driver.
Figure 2B:
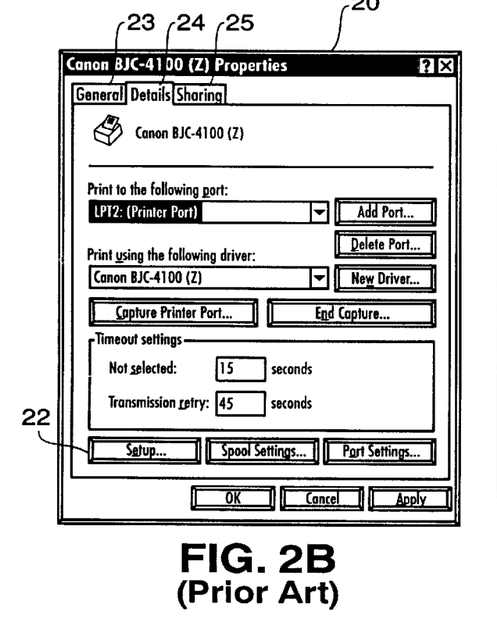

FIGS. 2A and 2B illustrate a printer property sheet 20 for a conventional 32-bit printer driver. As shown in these figures, property sheet 20 only includes the property pages provided automatically by default by the operating system, namely "General" page 23 (shown in FIG. 2A), "Details" page 24 (shown in FIG. 2B) and "Sharing" page 25 (similar to page 140 shown in FIG. 9). Since a 16-bit DDI entry point was not detected in this case, no printer driver property pages were displayed integrally with the operating system property pages. Instead, the operating system provided Setup button 22 (shown in FIG. 2B) as an entry point to a second property sheet.

Figure 3:
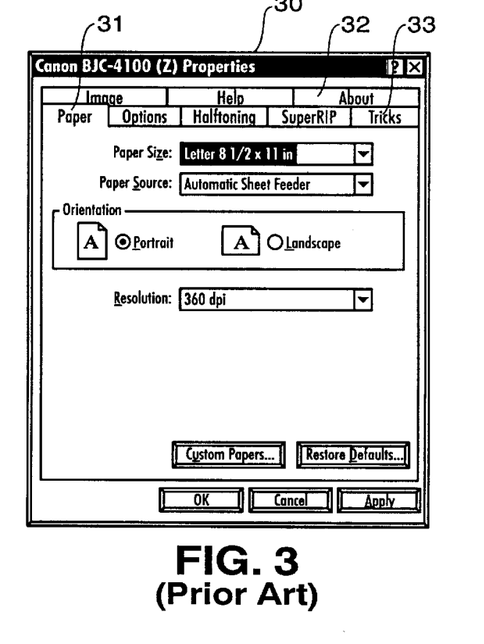
FIG. 3 illustrates a supplemental property sheet for a printer using a conventional 32-bit printer driver.

Upon user selection of Setup button 22, a second property sheet, such as property sheet 30 shown in FIG. 3, is displayed. This additional property sheet contains the property pages generated by the 32-bit printer driver, that is, all the additional property pages that are needed to set properties for the printer. The printer driver's property pages, such as pages 31 through 33, are inserted into property sheet 30 using standard Windows API functions.

Such an arrangement is less than desirable, since full control over the printer requires access to two separate property sheets. That is, to fully control printer settings, a user must access the standard Windows-generated property pages, as well as a second property sheet, activated from the "setup" button on the first, for the property pages generated by the 32-bit driver itself. Moreover, it can be difficult for a user to fully view both such property sheets at the same time. This causes inconvenience to the user and slows the speed with which printer settings can be changed.

Finally, the user typically is required to know that additional printer settings can be accessed via the setup interface button. In particular, property sheet 20 initially displays General page 23. Accordingly, to access these additional printer settings a user generally must know to select Details page 24 and then select setup interface button 22 in order to obtain secondary property sheet 30. This causes further inconvenience to the user.

It is noted that merely inserting the 32-bit property pages into the Windows-generated property sheet 20 using shell extensions will still result in the "setup" button 22 appearing. This is confusing to the user, since the setup button 22 no longer accesses any printer setup information.

What is needed, therefore, is a 32-bit printer driver which has a 32-bit user interface to take advantage of the additional features available to 32-bit code, while at the same time both providing property pages that can be integrally displayed with those of the Windows operating system and suppressing the display of a "setup" button, which could otherwise be confusing to a user.

SUMMARY OF THE INVENTION

It is an object of the invention to address the foregoing need by providing a 32-bit printer driver whose 32-bit property pages can be displayed in a single property sheet together with the Windows-generated property pages, without the necessity of an additional "setup" button or a second property sheet.

In one aspect, the invention is a printer driver having a 32-bit portion for providing a 32-bit property page for insertion into a standard Windows property sheet. This can be accomplished, for example, by using a Windows shell extension. The printer driver also has a 16-bit portion for exposing a device driver interface (DDI) entry point, and for providing a dummy property page when the DDI entry point is called. According to this aspect of the invention, the dummy property page is destroyed before it is displayed.

Because the property page is added to the standard Windows property sheet, such as by using a shell extension, a single property sheet is sufficient to include all property pages that can affect settings to the printer. At the same time, the 16-bit portion, since it supplies a dummy property page, causes the operating system to suppress the "setup" button user interface that would otherwise automatically be generated by the operating system. Thus, a distracting and useless button is not displayed. Furthermore, since the dummy property page is destroyed before it is displayed, there is no visible indication of the dummy property page, which otherwise might also distract the user.

According to another aspect, the invention is a printer driver having a 32-bit property sheet shell extension registered for printers. A 16-bit portion of the printer driver exposes a device driver interface entry point which provides a dummy property page when the device driver interface entry point is called, the dummy property page indicating that a callback function is to be executed. According to this aspect of the invention, the callback function signals the operating system to destroy the dummy property page before it is displayed.

The foregoing arrangement can provide property pages integrally displayed with those of a windowing operating system, while preventing display of a distracting setup button or a 16-bit property page.

This brief summary has been provided so that the nature of the invention may be understood quickly. A more complete understanding of the invention can be obtained by reference to the following detailed description of the preferred embodiment thereof in connection with the attached drawings.

DETAILED DESCRIPTION OF THE PREFERRED EMBODIMENTS

Figure 4:
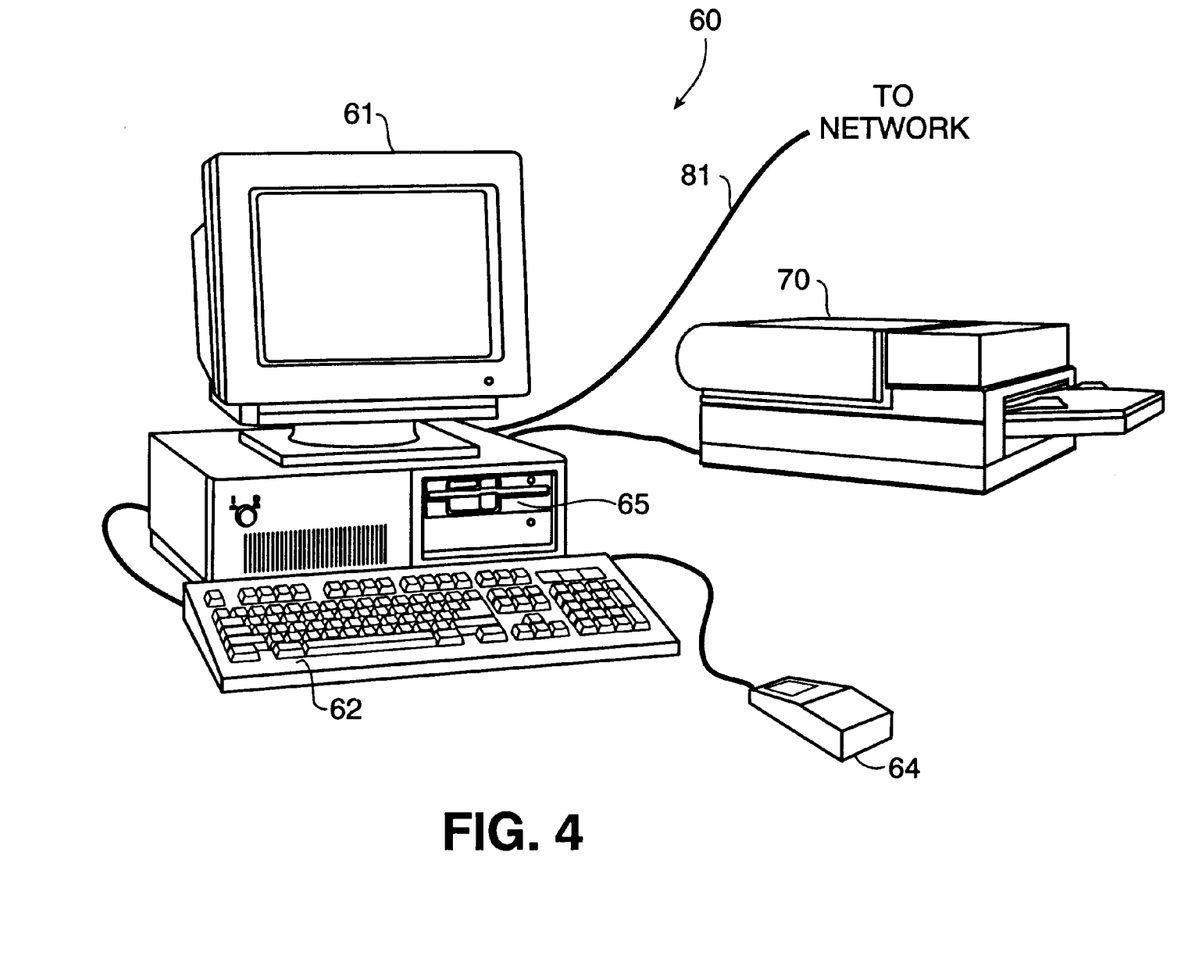
FIG. 4 is a perspective view of the outward appearance of a computer workstation which embodies the invention.

FIG. 4 is a view showing the outward appearance of a representative computer workstation embodying the present invention. Shown in FIG. 4 is a workstation 60, such as an IBM PC or PC-compatible computer having a windowing environment, such as Microsoft Windows™. Provided with workstation 60 is a display screen 61, such as a color monitor, a keyboard 62 for entering user commands, and a pointing device 64, such as a mouse, for pointing to and for manipulating objects displayed on screen 61.

Workstation 60 includes a mass storage device such as a computer disk 65 for storing data files and application program files. A printer 70 is provided for obtaining hard-copy output. In addition, workstation 60 can communicate with other peripherals, servers and workstations via network connection 81.

Figure 5:
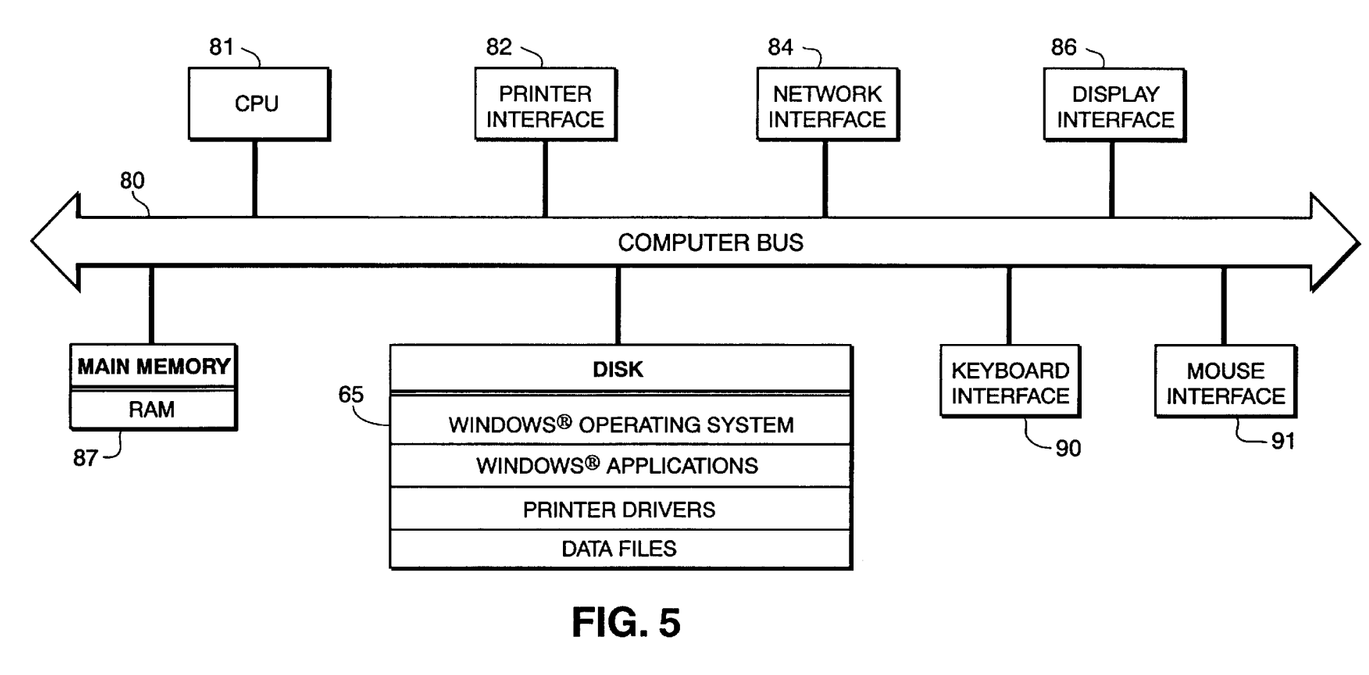
FIG. 5 is a block diagram of the workstation shown in FIG. 4.

FIG. 5 is a detailed block diagram showing the internal construction of workstation 60. As shown in FIG. 5, workstation 60 includes a central processing unit (CPU) 81 interfaced with a computer bus 80. Also interfaced with computer bus 80 is a printer interface 82, a network interface 84, a display interface 86, a keyboard interface 90, a mouse interface 91, a main memory 87, and a fixed disk 65. Disk 65 stores a Windows operating system, various Windows applications, printer drivers and data files. The main memory 87 interfaces with the computer bus 80 so as to provide random access memory storage for use by CPU 81 while executing stored process steps such as those of the stored application programs and printer drivers. More specifically, CPU 81 loads those process steps from disk 65 into the main memory 87 and executes those stored process steps out of main memory 87.

Figure 6A:
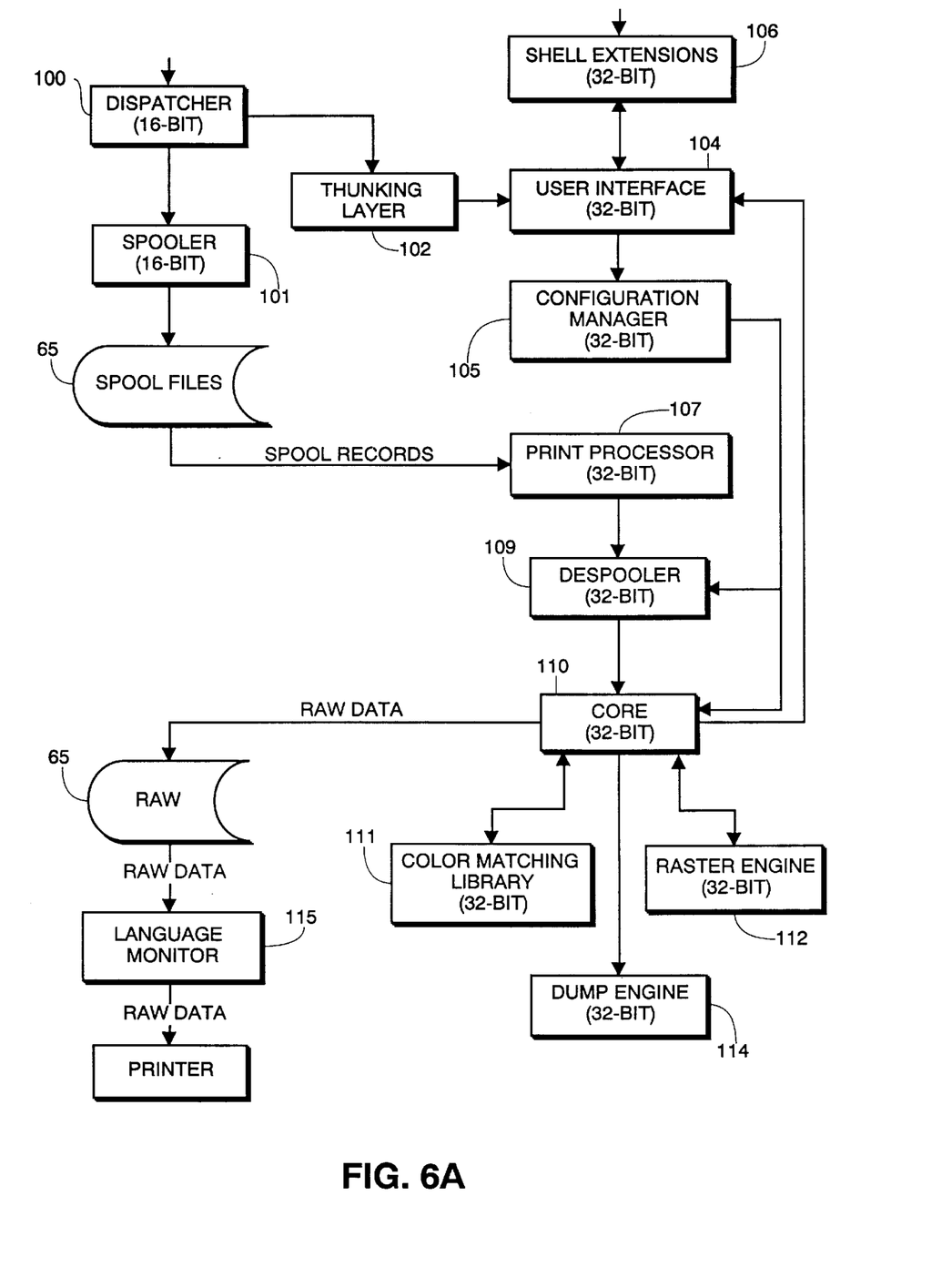
FIG. 6A is a functional block diagram of a printer driver according to the invention.

FIG. 6A is a functional block diagram of a printer driver according to the invention. In FIG. 6A, dispatcher 100 is a 16-bit dynamic link library (DLL) which exports all entry points required by the Windows graphics device interface for printer drivers. Dispatcher 100 also dispatches incoming calls to the appropriate components. In particular, print job control and graphics function calls are dispatched to spooler 101, while user interface and capability query function calls are dispatched to user interface 104 via thunking layer 102.

Spooler 101 is a 16-bit DLL which generates a spool file from graphics function calls provided by dispatcher 100, and writes the spool file into disk 65.

Thunking layer 102, which consists of a 16-bit DLL and a 32-bit DLL, passes user interface and capability-query function calls from 16-bit dispatcher 100 to 32-bit user interface 104.

User interface 104 is a 32-bit DLL which replies to capability queries received from dispatcher 100. In addition, user interface 104 replies to user interface requests. For example, upon request from shell extensions 106 user interface 104 creates property pages which display current printer settings. User interface 104 then interfaces with the user to permit those settings to be altered and saved, and maintains the saved settings using configuration manager 105.

Configuration manager 105 is a 32-bit DLL which interprets printer description and settings files.

Shell extensions 106 includes all of the printer driver's shell extensions for adding items to the printer's context menu and for providing additional property pages, as described in more detail below.

Print processor 107 is a 32-bit DLL which reads the spool file from disk 65, and passes the spool file to despooler 109.

Despooler 109 is a 32-bit DLL which interprets the spool file and implements printing features such as multiple copies, duplexing, collation and the like, based on settings information received from configuration manager 105.

Core 110 is a 32-bit DLL which accepts graphical objects from despooler 109 and which, based on settings information from configuration manager 105, produces raw printer data using color matching library 111, raster engine 112 and dump engine 114. Core 110 then writes the raw printer data into a file in disk 65.

Color matching library 111 adjusts colors to ensure optimum color quality for a wide variety of printer hardware, media types and resolutions.

Raster engine 112 is a 32-bit DLL which draws raster graphics on surfaces allocated by core 110. Specifically, raster engine 112 is capable of drawing pixels, scan lines, polylines and text, as well as transferring bit maps to and from the surface.

Dump engine 114 is a 32-bit DLL which encodes raster graphics data as printer control language. Dump engine 114 also converts raster data into raw printer data by performing color conversion, halftoning and smoothing.

Language monitor 115, which consists of two 32-bit DLLs and one 16-bit DLL, performs post-processing of the raw printer data before it reaches the printer. For example, when language monitor 115 detects a particular code in the print job, it interrogates the printer firmware for the currently installed ink cartridge type and issues a warning in case the installed ink cartridge type does not match the cartridge type expected by the print job.

Figure 6B:
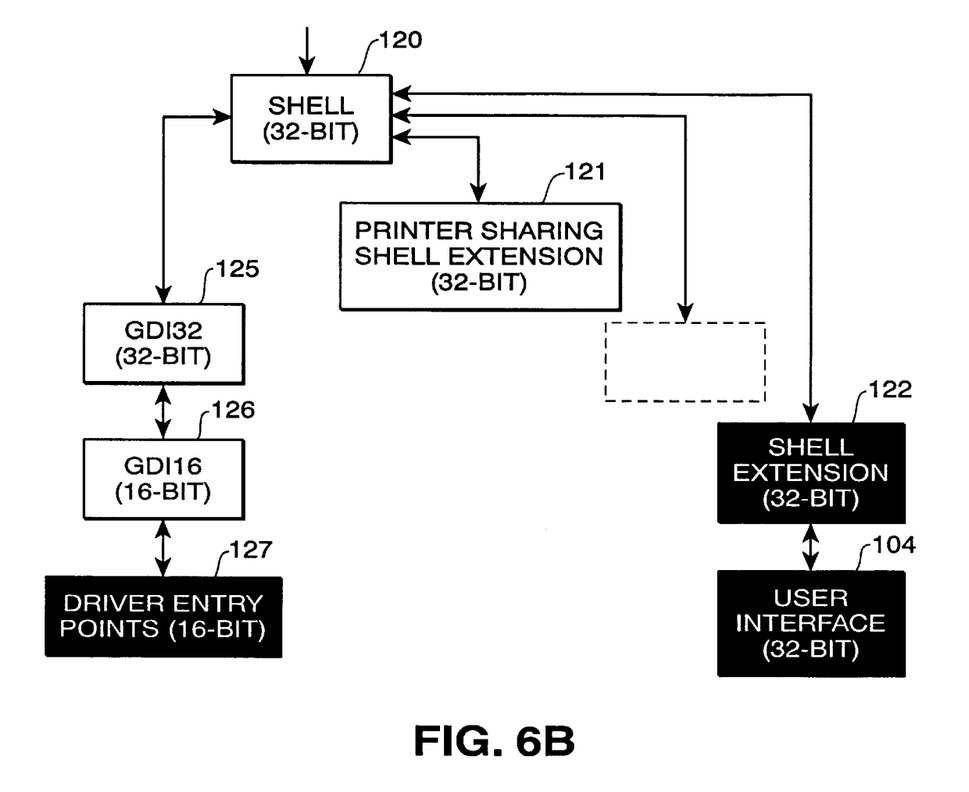
FIG. 6B is a functional block diagram illustrating the interaction between a printer driver according to the invention and the operating system during creation of a property sheet.

FIG. 6B is a functional block diagram illustrating the interaction between a printer driver according to the invention and the Windows 95™ operating system. In FIG. 6B, the white-background blocks illustrate components of the operating system and the black-background blocks are components of the printer driver. Each of blocks 122, 124 and 127 is implemented using computer-executable process steps which can be stored on disk 65, downloaded from disk 65 to main memory 87, and executed by CPU 81 out of main memory 87.

Shell 120 is provided by the Windows operating system and is primarily responsible for display and manipulation of system objects, such as files, folders and printers. For example, shell 120 generates and displays the contents of the Printers folder, generates and displays a context menu when a user right-clicks on a printer, and generates and displays a property sheet when a user selects "Properties" from the context menu.

Shell extension 122 is included in shell extensions 106 (shown in FIG. 6A), and is provided by the printer driver according to the invention. In more detail, shell extension 122 is a shell extension implemented in a 32-bit DLL, which is registered for printer property sheets, as described in detail below. Upon request from shell 120, shell extension 122 queries user interface 104 for property pages and then provides those property pages to shell 120, whereby those property pages are integrally displayed with the operating system's property pages.

As noted above, shell extension 122 is a registered shell extension. In this regard, the Windows operating system permits use of a type of software mechanism, generically termed "shell extensions", by which programmers can provide features in addition to those provided by shell 120. One type of shell extension, called a "property sheet shell extension" or a "property sheet handler", permits programmers to add property pages to an object's property sheet. In order to add property pages to a property sheet, a property sheet shell extension is first created within a DLL and then registered with the appropriate branch of the Windows registry. Specifically, the Windows registry is a hierarchical database that contains information about system software resources, such as printers, keyboard configurations and the like.

In the preferred embodiment, the printer driver according to the invention registers shell extension 122 during installation of the printer, such as when the printer is added to the Printers folder using the Windows "Add Printer" function. Alternatively, shell extension 122 could be registered by creating a "registration file" containing appropriate ASCII statements and using the registry editor to merge the contents of the registration file into the registry.

In the preferred embodiment, the printer driver registers shell extension 122 in the following two steps. As background, it is noted that shell extension 122 has a unique class ID which has been generated for it using the UUID-GEN utility included with the Windows SDK.

Figure 7A:
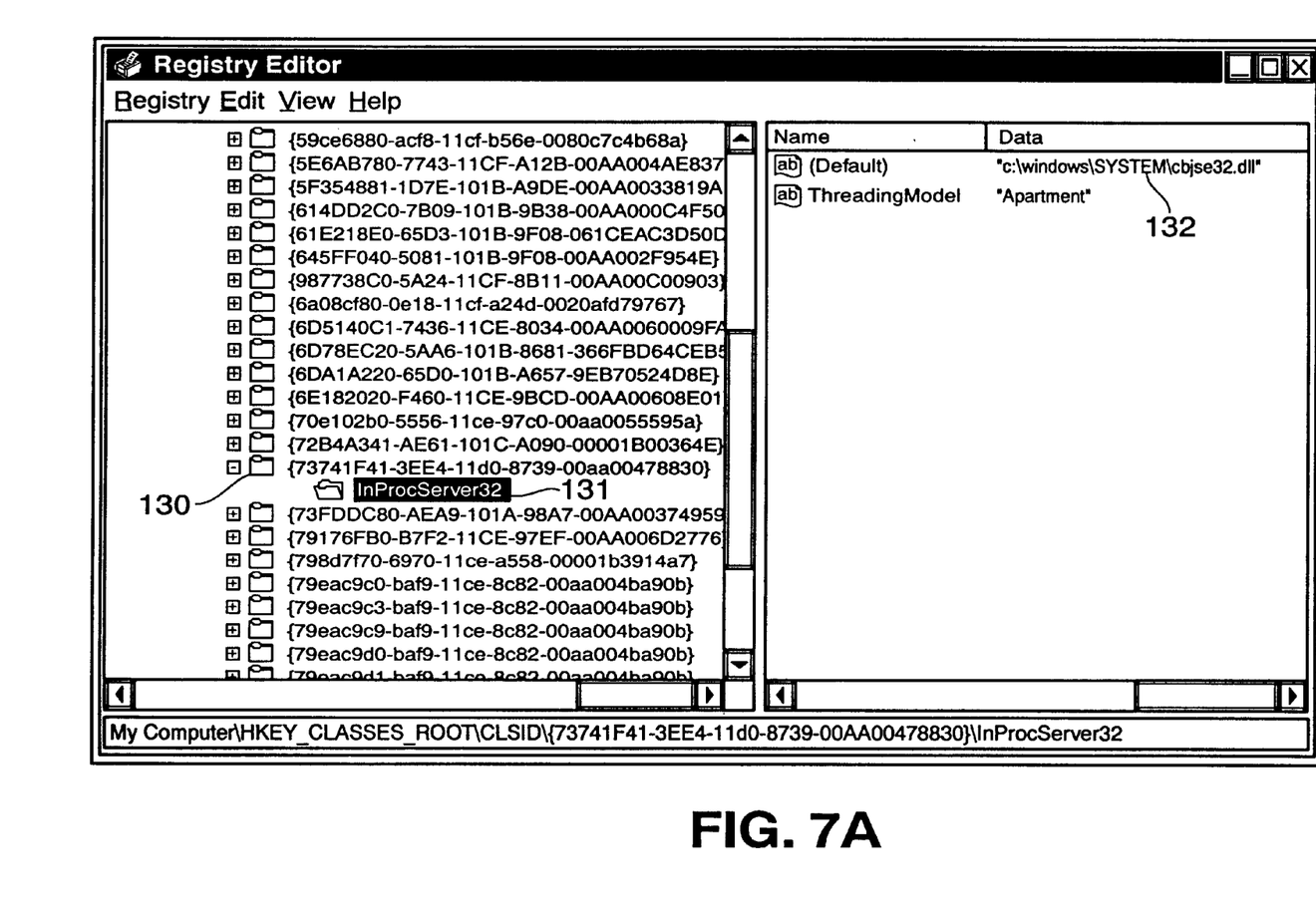
FIGS. 7A and 7B depict a display of the Windows Registry Editor, as it would appear on a computer monitor, for explaining registration of a property sheet handler.

First, the shell extension's class ID is added as a new key to the Windows registry under the HKEY_CLASSES_ROOT\CLSID branch of the registry, and an InProcServer32 subkey is also added, the InProcServer32 subkey specifying the name of and path to the DLL containing the shell extension. Thus, FIG. 7A shows newly added class ID 130 having subkey 131 which contains path 132 to the appropriate DLL.

Figure 7B:
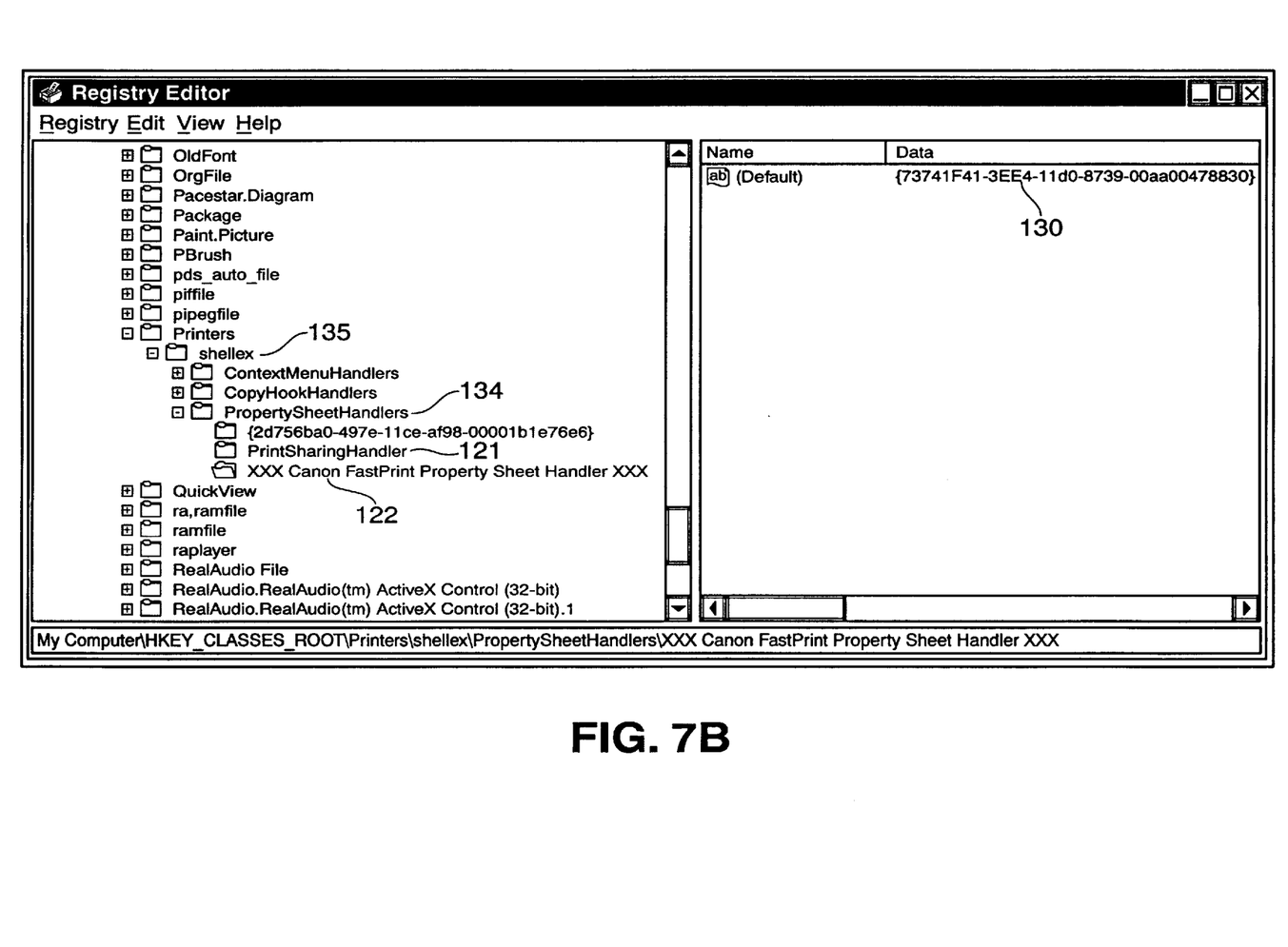

Second, shell extension 122 is registered for the specific class of objects to which it pertains. Specifically, as shown in FIG. 7B, this step is performed by adding shell extension 122 under the PropertySheetHandlers subkey 134 under the shellex key 135 of the HKEY_CLASSES_ROOT\Printers branch of the registry. As seen in FIG. 7B, property sheet shell extension 122 references class ID 130. As a result, shell extension 122 is registered for printer property sheets.

Returning to FIG. 6B, printer sharing shell extension 121 is a 32-bit registered shell extension provided by the Windows operating system. Printer sharing shell extension 121 also is registered for printer property sheets. Thus, as shown in FIG. 7B, printer sharing shell extension 121 also is registered under the PropertySheetHandlers subkey 134 under the shellex key 135 of the HKEY_CLASSES_ROOT\Printers branch of the registry.

User interface 104 in FIG. 6B is a 32-bit user interface provided by the printer driver according to the invention, the function of which is described above in connection with the description of FIG. 6A.

The Windows 32-bit graphics device interface (GDI32) 125 provides graphical user interfaces for the Windows operating system.

The Windows 16-bit graphics device interface (GDI16) 126 provides an interface between GDI32 125 and 16-bit applications such as 16-bit printer drivers.

The 16-bit driver entry points portion 127 is located within the dispatcher 100 of the printer driver and includes an ExtDeviceModePropSheet DDI entry point. As described in more detail below, upon request the ExtDeviceModePropSheet DDI entry point according to the invention provides a dummy property page which includes a feature that causes the dummy property page to be destroyed before it is displayed.

Figure 8:
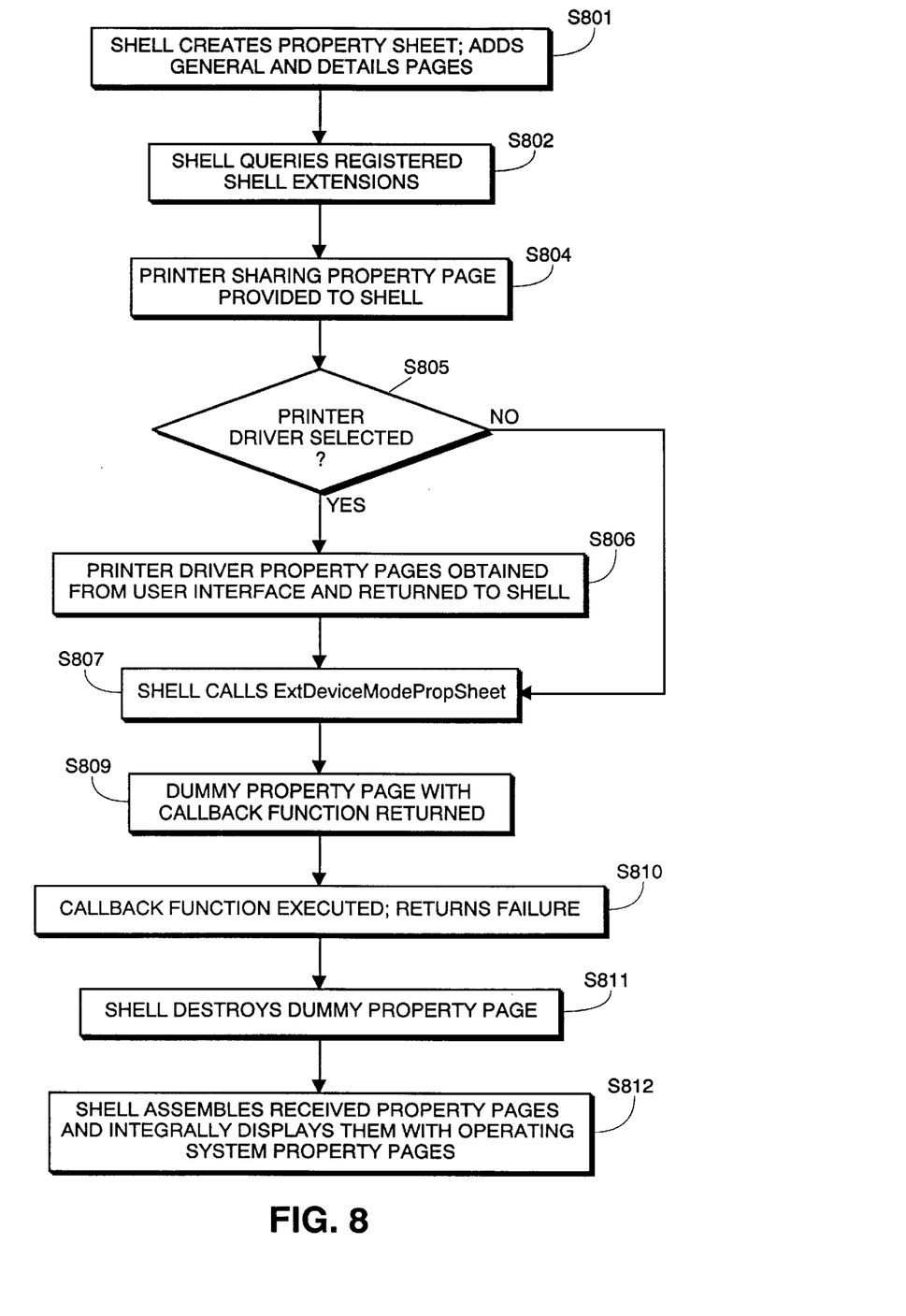
FIG. 8 is a flow diagram illustrating the processing which occurs according to the present invention when the operating system has received a request to display a printer property sheet.

The operation of the foregoing arrangement will now be described with reference to FIG. 8. FIG. 8 is a flow diagram illustrating the processing that occurs according to a representative embodiment of the present invention when a user selects "Properties" for a printer. Briefly, according to FIG. 8, shell 120 creates a property sheet and adds General and Details property pages to it; shell 120 queries all registered shell extensions; shell extension 121 provides a printer sharing property page; shell extension 122 obtains the printer driver property pages from user interface 104, if appropriate, and returns those property pages to shell 120; shell 120 calls ExtDeviceModePropSheet and the device driver DDI entry point returns a dummy property page with a callback function; the callback function is executed and returns failure; shell 120 then destroys the dummy property page; and finally shell 120 assembles the property pages received from the registered shell extensions and displays them together with the operating system property pages.

In more detail, in step S801 shell 120 creates a property sheet and adds standard property pages to the property sheet. These standard pages typically include a "General" property page, such as shown in FIG. 2A, which displays a comment entered by the user and which provides a button permitting the user to print a test page using the printer. The other standard property page provided by shell 120 is a "Details" property page, such as shown in FIG. 2B, for viewing and altering the port to which jobs will be printed, adjusting printer timeout settings, and providing interface buttons to additional dialog boxes for adding new ports, deleting ports, capturing ports, ending port captures, adding new printer drivers, altering spool settings and altering port settings.

In step S802, shell 120 examines the PropertySheetHandlers subkey 134 under the shellex key 135 of the HKEY_CLASSES_ROOT\Printers branch of the Windows registry in order to locate all shell extensions registered for printer property sheets. Each such registered shell extension is then sequentially queried to provide property pages.

Figure 9:
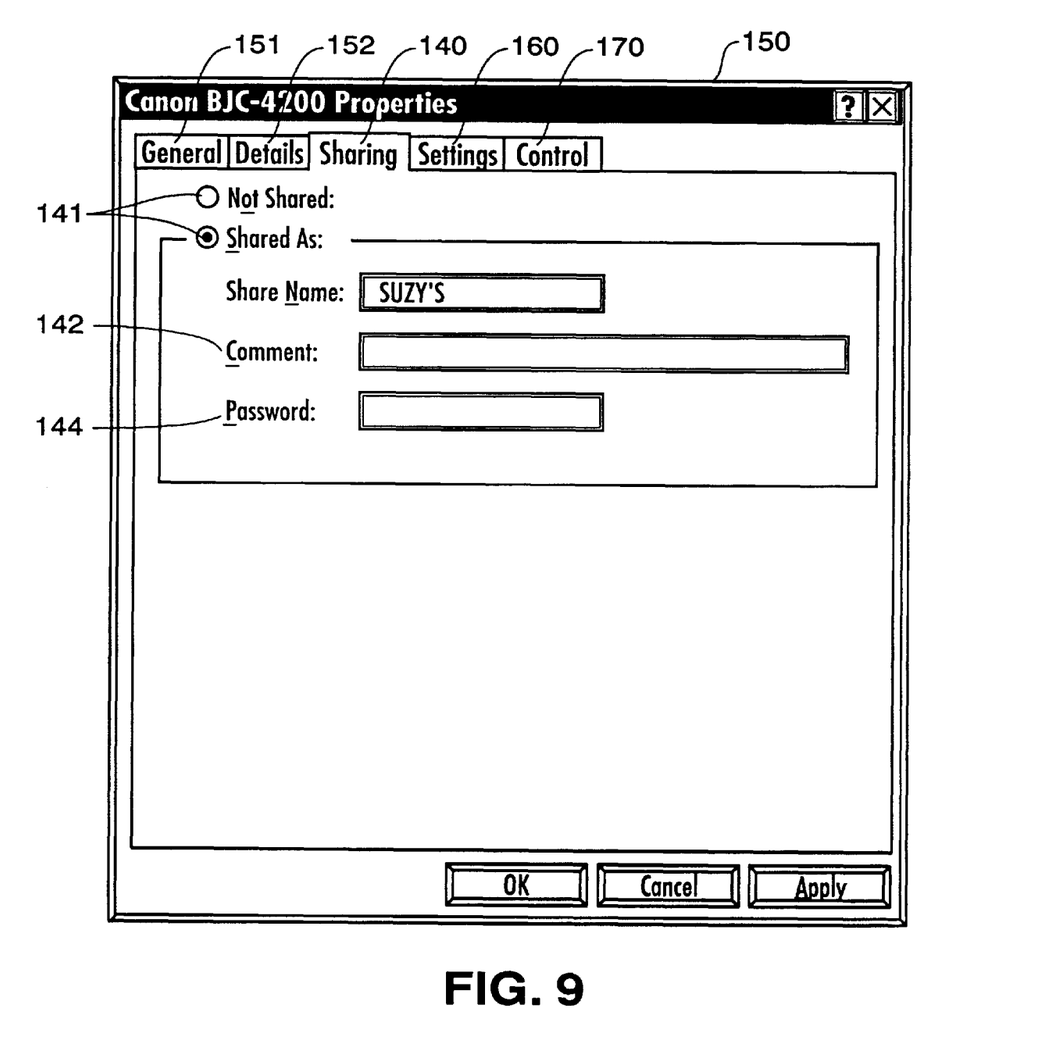
FIG. 9 illustrates a printer "Sharing" property page, as displayed on a computer monitor.

In step S804, responding to shell 120's query, printer sharing shell extension 121 generates and provides a "Sharing" property page, such as sharing property page 140 illustrated in FIG. 9. As seen in FIG. 9, sharing property page 140 includes radio buttons 141 indicating whether the printer is shared with other computers on the network, the share name 142 which appears to those other computers, and any password 144 required to access the printer over the network. The contents of each of these fields can be changed by the user. It should be noted that shell extension 121 will not provide a property page in all cases. Thus, for example, if the workstation is not networked or if the subject printer is a network printer, then printer sharing shell extension 121 simply does not provide a Sharing property page.

Returning to FIG. 8, in step S805, responding to shell 120's query, shell extension 122 within the printer driver determines whether the printer driver to which it corresponds has been selected for the current printer. If so, then processing proceeds to step S806. On the other hand, if another printer driver has been selected for the current printer, then processing proceeds to step S807 and no property pages are returned.

In step S806, shell extension 122 calls user interface 104 which generates display information for the printer driver's property pages and passes that information to shell extension 122. Shell extension 122 then returns that property page information to shell 120. As a result, the printer driver's property pages will be integrally displayed with the operating system's property pages.

In this regard, the printer driver's property pages typically provide a user the access necessary to view and modify settings related to printer-specific functionality (i.e., printer-specific settings). Property pages provided by the printer driver to the operating system according to the preferred embodiment are shown in FIGS. 10 and 11.

Figure 10:
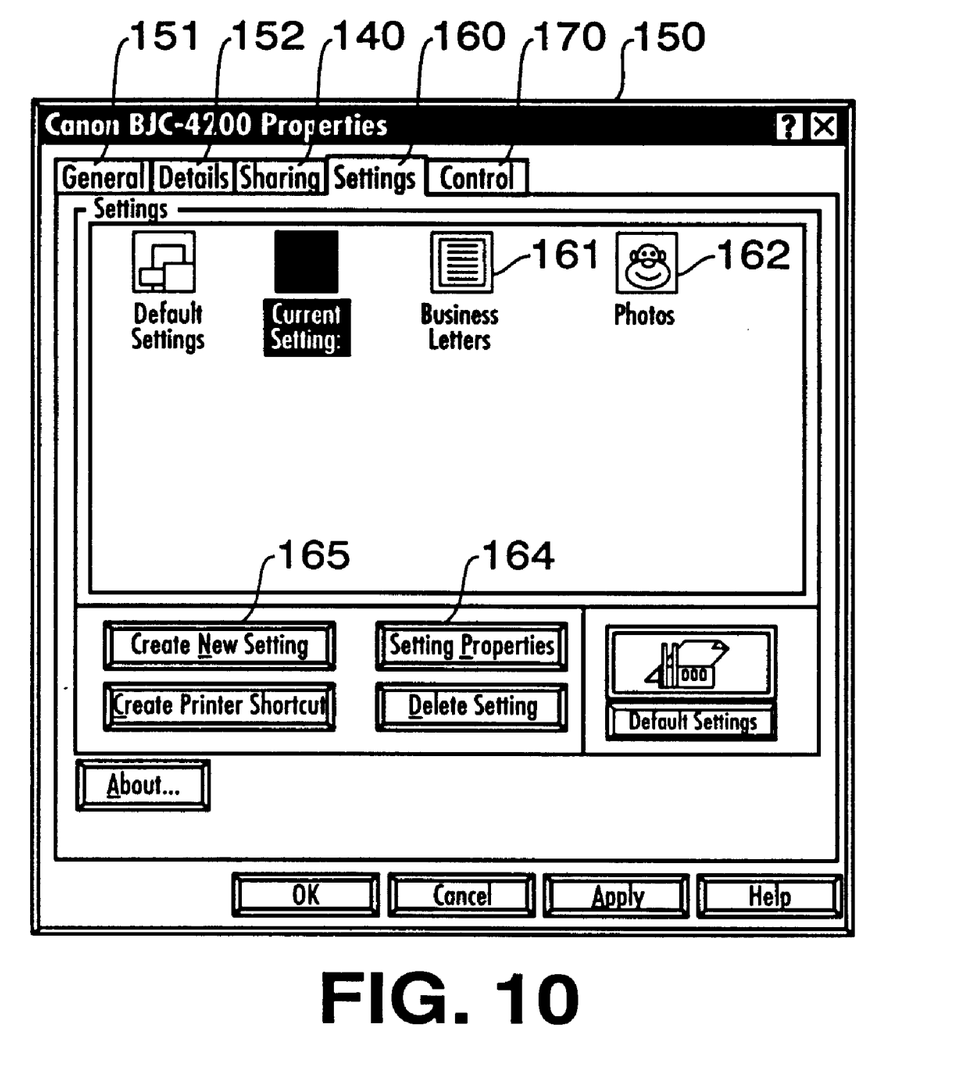
FIG. 10 illustrates a "Settings" property page provided by a printer driver according to the invention, as displayed on a computer monitor.

Specifically, FIG. 10 shows "Settings" property page 160 as displayed on a computer monitor. Settings property page 160 permits a user to designate any displayed pre-defined or user-defined settings configuration, such as settings configuration 161 or 162, as the current settings configuration. This can be effected, for example, by double-clicking on the desired settings configuration. In addition, Settings property page 160 permits a user to edit such defined settings configurations by first selecting the desired settings configuration and then selecting "Setting Properties" button 162. Similarly, Settings property page 160 permits a user to create a new settings configuration by selecting "Create New Setting" button 165.

Figure 11:
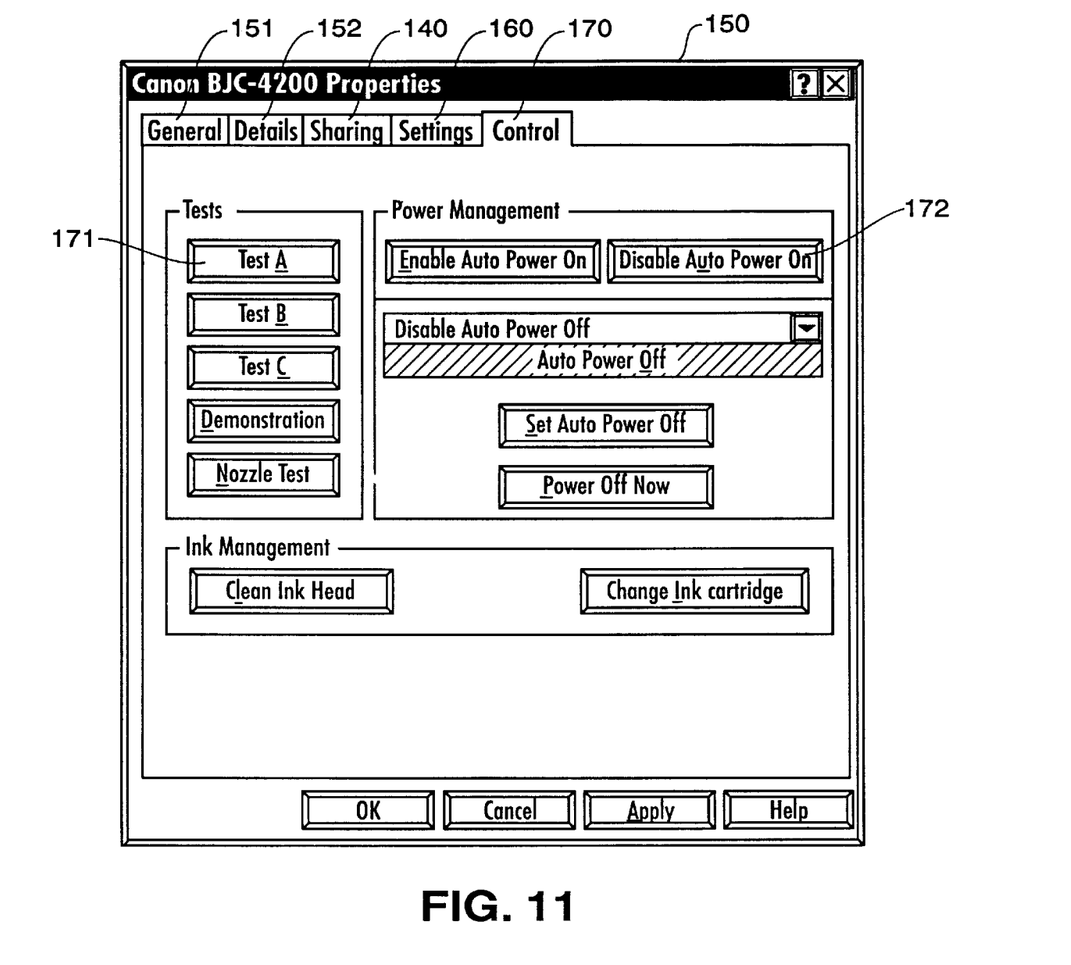
FIG. 11 illustrates a "Control" property page provided by a printer driver according to the invention, as displayed on a computer monitor.

Another property page provided to the operating system in step S806 of the preferred embodiment is "Control" property page 170, shown in FIG. 11. Control property page 170 permits a user to cause the printer to run self-diagnostic tests, for example by selecting button 171, or to alter the printer's power management settings, such as by selecting button 172.

As noted above in connection with the discussion of FIG. 10, Settings page 160 permits the user to alter printer-specific settings by selecting among relatively high-level user-defined or pre-defined settings configurations. The preferred embodiment therefore permits very fast alteration of the printer-specific settings. The specific settings associated with each such settings configuration can also be altered by selecting Setting Properties button 164.

However, although the above-described property pages are preferred, any other property pages that permit a user to alter settings related to printer-specific functionality may instead (or also) be provided in step S806. For example, property pages permitting a user to alter lower-level printer-specific settings might instead (or also) be provided in this step. Such lower level printer-specific settings might include, for example, printer resolution, color model (e.g., monochrome, color for text, and color for pictures), half-toning modes, color adjustment modes, intensity, paper size (e.g., letter size or legal size), paper orientation (e.g., portrait or landscape), paper feed (e.g., automatic or manual), number of copies, collation, reverse printing, paper source (e.g., upper tray or lower tray), duplexing, printer fonts, and the like. As noted above, such lower-level printer-specific settings are altered in the preferred embodiment when editing an existing or creating a new settings configuration.

Returning to FIG. 8, in step S807, after querying all printer-registered shell extensions, shell 120 calls GDI32 125 to load the printer driver for the printer and query the printer driver for its property pages. GDI32 125 then passes the call on to GDI16 126, which loads the printer driver and calls the ExtDeviceModePropSheet DDI entry point within the driver entry points portion 127 of the printer driver, as described in more detail above.

In step S809, the ExtDeviceModePropSheet DDI entry point responds by providing a dummy property page. In this regard, ordinarily a printer driver's ExtDeviceModePropSheet DDI entry point will specify a number of parameters, according to which shell 120 will display one or more property pages. However, in the present invention it is intended that the dummy property page provided by the ExtDeviceModePropSheet DDI entry point will never be displayed. Accordingly, most of these parameters generally can be arbitrarily set, and in most cases can be set to a null value.

However, in the dummy property page information provided in the present invention certain parameters have specific values. In particular, among the parameters that can be specified in such property page information are a flag indicating that a callback function is to be used, together with the address of the callback function. The callback function feature is typically used by printer drivers to obtain notification that the property page is about to be displayed. This callback function feature is used in the dummy property page according to the invention, and therefore the appropriate flag is set to indicate that a callback function is to be used, and the address of the callback function are provided, in the dummy property page information provided by the printer driver according to the invention. The dummy property page information is then transmitted to shell 120 via GDI16 126 and GDI132 125.

As noted above, the Windows operating system always checks for the DDI entry point when a printer's property sheet is requested. If the DDI entry point is not detected or a property page is not provided in response to the operating system's call to the DDI entry point, a "setup" button, which provides an interface to a secondary property sheet, is provided. Since in this case shell 120 receives a property page in response to its call to the ExtDeviceModePropSheet DDI entry point, shell 120 suppresses display of a setup interface button, thereby omitting it from the displayed property sheet. At the same time, as described in more detail below, shell 120 will destroy the dummy property page provided before it is ever displayed.

In step S809, the callback function included in the dummy property page is executed by the operating system to notify the driver that the page is about to be displayed. In this case, the callback function specified in the dummy property page simply returns a failure flag each time it is called.

In step S810, shell 120 detects the failure of the callback function and destroys the dummy property page before it is ever displayed.

In step S811, shell 120 adds the property pages received from the registered shell extensions into the property sheet and then displays the property sheet, with the operating system property pages integrally displayed with those provided by the printer driver.

As a result of the foregoing processing, a property sheet such as that shown in FIG. 10 is generated. As shown in FIG. 10, property sheet 150 includes property pages 151, 152 and 140 which are provided automatically by default by the operating system. Pages 151, 152 and 140 are integrally displayed with property pages 160 and 170 provided by the printer driver, even though the printer driver uses a 32-bit user interface. Moreover, since a property page was provided by ExtDeviceModePropSheet, the operating system does not display a setup button. At the same time, the dummy property page is not displayed, since the callback function referenced in it returns failure, causing the operating system to destroy the dummy property page. Thus, according to the invention a printer driver having a 32-bit user interface provides property pages integrally displayed with the property pages of the operating system, and without a potentially confusing "setup" button or a tab for a 16-bit property page.

The invention has been described above with respect to particular illustrative embodiments. However, it is to be understood that the invention is not limited to the above-described embodiments. Various other changes and modifications may be made by those of ordinary skill in the art without departing from the spirit and scope of the invention.

What is claimed is:

1. A printer driver comprising:
   a 32-bit portion for providing a 32-bit property page for insertion into a standard windows property sheet; and
   a 16-bit portion for exposing a device driver interface entry point, and for providing a dummy property page when the entry point is called,
   wherein the dummy property page is destroyed before it is displayed.

2. A printer driver according to claim 1, wherein the 32-bit portion comprises a shell extension and a user interface.

3. A printer driver according to claim 2, wherein upon receipt of a query for additional property pages, the shell extension calls the user interface to create the property page and returns a handle for the property page to the shell.

4. A printer driver according to claim 1, wherein the dummy property page includes an indication that a callback function is to be executed.

5. A printer driver according to claim 4, wherein the callback function always returns an indication of failure.

6. A printer driver according to claim 1, wherein the 32-bit property page permits user selection of one of plural defined printer configuration settings.

7. A printer driver according to claim 1, wherein the 32-bit property page displays settings corresponding to printer-specific functionality.

8. A printer driver comprising:
   a 32-bit property sheet shell extension registered for printers;
   a 16-bit portion which exposes a device driver interface entry point and which provides a dummy property page when the device driver interface entry point is called, the dummy property page indicating that a callback function is to be executed,
   wherein the callback function signals an operating system to destroy the dummy property page before it is displayed.

9. A printer driver according to claim 8, wherein when queried the 32-bit property sheet shell extension calls a 32-bit user interface to create a 32-bit property page and returns a handle for the 32-bit property page to the shell.

10. A printer driver according to claim 9, wherein the 32-bit property page permits user selection of one of plural defined printer configuration settings.

11. A printer driver according to claim 9, wherein the 32-bit property page displays settings corresponding to printer-specific functionality.

12. A printer driver according to claim 8, wherein the callback function always returns an indication of failure.

13. A method for providing a property page to a windowing operating system for insertion into a standard windows property sheet, said method comprising:
   providing the property page for insertion into the standard windows property sheet; and
   providing a dummy property page,
   wherein the dummy property page includes a feature that causes the dummy property page to be destroyed before it is displayed.

14. A method according to claim 13, wherein the property page is provided by a 32-bit registered shell extension.

15. A method according to claim 13, wherein the dummy property page is provided by a 16-bit device driver interface entry point.

16. A method according to claim 13, wherein the feature that causes the dummy property page to be destroyed before it is displayed comprises an indication that a callback function is to be executed.

17. A method according to claim 16, wherein the callback function always returns an indication of failure.

18. A method according to claim 13, wherein the property page displays settings corresponding to printer-specific functionality.

* * * * *